United States Patent
Nakama et al.

(10) Patent No.: US 10,329,487 B2
(45) Date of Patent: *Jun. 25, 2019

(54) HEAT-ABSORBING MATERIAL THAT USES MAGNESIUM PHOSPHATE HYDRATE

(71) Applicant: NICHIAS CORPORATION, Tokyo (JP)

(72) Inventors: Shigeru Nakama, Tokyo (JP); Norihiro Kihara, Tokyo (JP); Taichi Shiratori, Tokyo (JP); Daisuke Tsumura, Tokyo (JP)

(73) Assignee: NICHIAS CORPORATION, Tokyo (JP)

(*) Notice: Subject to any disclaimer, the term of this patent is extended or adjusted under 35 U.S.C. 154(b) by 171 days.

This patent is subject to a terminal disclaimer.

(21) Appl. No.: 15/117,843

(22) PCT Filed: Feb. 14, 2014

(86) PCT No.: PCT/JP2014/000765
§ 371 (c)(1),
(2) Date: Aug. 10, 2016

(87) PCT Pub. No.: WO2015/121894
PCT Pub. Date: Aug. 20, 2015

(65) Prior Publication Data
US 2017/0009139 A1   Jan. 12, 2017

(51) Int. Cl.
*C09K 21/04* (2006.01)
*H01B 7/295* (2006.01)
(Continued)

(52) U.S. Cl.
CPC .......... *C09K 21/04* (2013.01); *B65D 21/0201* (2013.01); *B65D 81/18* (2013.01); *B65D 85/70* (2013.01); *C09K 5/18* (2013.01); *H01B 7/29* (2013.01); *H01B 7/292* (2013.01); *H01B 7/295* (2013.01)

(58) Field of Classification Search
None
See application file for complete search history.

(56) References Cited

U.S. PATENT DOCUMENTS

| 2004/0203310 A1* | 10/2004 | Watanabe | A41D 31/0038 442/414 |
| 2008/0132594 A1* | 6/2008 | Iwase | C08G 18/4072 521/98 |

(Continued)

FOREIGN PATENT DOCUMENTS

| JP | 9-3778 A | 1/1997 |
| JP | 2006-160858 A | 6/2006 |

(Continued)

OTHER PUBLICATIONS

Extended European Search Report issued in corresponding application 14882256.2 completed Sep. 7, 2017 and dated Sep. 18, 2017.

(Continued)

*Primary Examiner* — Joseph D Anthony
(74) *Attorney, Agent, or Firm* — Griffin & Szipl, P.C.

(57) ABSTRACT

A heat-absorbing material including particles including a magnesium phosphate hydrate and a binder.

15 Claims, 2 Drawing Sheets

(51) Int. Cl.
*B65D 85/00* (2006.01)
*H01B 7/29* (2006.01)
*B65D 21/02* (2006.01)
*B65D 81/18* (2006.01)
*C09K 5/18* (2006.01)

(56) References Cited

U.S. PATENT DOCUMENTS

| | | | | |
|---|---|---|---|---|
| 2010/0108434 A1* | 5/2010 | Iwase | ................ | C08G 18/4072 |
| | | | | 181/204 |
| 2013/0034732 A1* | 2/2013 | Parker | .................... | C04B 28/10 |
| | | | | 428/402 |
| 2017/0297298 A1* | 10/2017 | Tsumura | ................... | B32B 5/18 |

FOREIGN PATENT DOCUMENTS

| | | | |
|---|---|---|---|
| JP | 2008-138032 A | 6/2006 |
| JP | 2008-274253 A | 11/2008 |
| JP | 2009-191493 A | 8/2009 |
| JP | 2010-126389 A | 6/2010 |
| JP | 2010-126961 A | 6/2010 |

OTHER PUBLICATIONS

International Search Report issued in corresponding application PCT/JP2014/000765, completed Mar. 11, 2014 and dated Mar. 18, 2014.

International Preliminary Report on Patentability issued in corresponding application PCT/JP2014/000765 dated Aug. 16, 2016.

* cited by examiner

HEAT-ABSORBING MATERIAL THAT USES MAGNESIUM PHOSPHATE HYDRATE

This is a National Phase Application in the United States of International Patent Application No. PCT/JP2014/000765 filed Feb. 14, 2014, the entire disclosure of which is hereby incorporated by reference.

TECHNICAL FIELD

The invention relates to a heat-absorbing material using a magnesium phosphate hydrate and a producing method thereof.

BACKGROUND ART

It is required for some facilities such as atomic power plants and thermal power plants that cables in the facilities have heat resistance or fire resistance against extraordinary accidents, e.g., fire. The heat resistance or fire resistance of cables is usually realized by covering the cables with a heat-absorbing material.

Conventional heat-absorbing materials include a water-containing polymer absorber and aluminum hydroxide hydrate. When heated, the polymer absorber absorbs heat, and the aluminum hydroxide hydrate absorbs heat by using water molecules (crystal water) contained therein.

However, the conventional heat-absorbing materials are bulky and heavy. Thus it is difficult to replace the covering of cables after laying cables since a working area for the exchange is narrow.

The polymer absorber is usually packed. If the package is broken, water evaporates at room temperature so that the polymer absorber becomes unable to function.

The absorber using aluminum hydroxide hydrate has a defect that cables are damaged before the hydrate decomposes since the decomposition temperature of hydrate is higher than the heatproof temperature of cables.

From the above, a heat-absorbing material is needed which does not require exchange, can be arranged in a small place, is lightweight and can efficiently absorb heat.

Magnesium phosphate hydrates are known as a heat-absorbing material (Patent Documents 1 and 2).

RELATED ART DOCUMENTS

Patent Documents

Patent Document 1: JP-A-2008-274253
Patent Document 2: JP-A-2009-191493

SUMMARY OF THE INVENTION

An object of the invention is to provide a novel heat-absorbing material.

As a result of diligent research, the inventors have found that a heat-absorbing material using particles containing a magnesium phosphate hydrate is easy to be handled and excellent as a heat-absorbing material, and made the invention based on the finding.

According to the invention, the following heat-absorbing material and production method therefor are provided.

1. A heat-absorbing material comprising particles comprising a magnesium phosphate hydrate and a binder.
2. The heat-absorbing material according to 1, wherein the magnesium phosphate hydrate is magnesium phosphate tribasic octahydrate.
3. The heat-absorbing material according to 1 or 2, wherein the binder is an inorganic binder.
4. The heat-absorbing material according to any one of 1 to 3, wherein the binder is sodium silicate.
5. The heat-absorbing material according to any one of 1 to 4, wherein the particles have an average diameter of 0.01 mm to 20 mm.
6. The heat-absorbing material according to any one of 1 to 5, wherein the particles are accommodated in a container.
7. The heat-absorbing material according to 6, wherein the container comprises a heat-resistant cloth.
8. The heat-absorbing material according to 7, wherein the heat-resistant cloth is a glass cloth, a silica cloth or an alumina cloth.
9. The heat-absorbing material according to 7, wherein the heat-resistant cloth is a cloth with aluminum being deposited on a surface thereof.
10. The heat-absorbing material according to any one of 1 to 9, wherein a plurality of the containers are serially connected to each other.
11. A method of producing a heat-absorbing material, comprising;
    mixing a magnesium phosphate hydrate and a liquid glass to form a mixture, granulating the mixture to form hydrous particles, and
    removing water from the hydrous particles to obtain particles.
12. The method according to 11, further comprising accommodating the particles in a container.

According to the invention, it is possible to provide a novel heat-absorbing material.

MODE FOR CARRYING OUT THE INVENTION

The heat-absorbing material of the invention comprises particles that comprise a magnesium phosphate hydrate and a binder.

Magnesium phosphate hydrates include magnesium phosphate tribasic octahydrate ($Mg_3(PO_4)_2 \cdot 8H_2O$) and 3, 5, 10 and 22 hydrates thereof. Magnesium phosphate tribasic octahydrate is preferred. Magnesium phosphate tribasic octahydrate decomposes and absorbs heat from around 100° C.

Inorganic binders and organic binders can be used as a binder.

Inorganic binders include sodium silicate (liquid glass derivatives, $Na_2SiO_3$, $Na_2O \cdot SiO_2$ or $Na_2O \cdot nSiO_2 \cdot mH_2O$), colloidal silica and bentonite. Sodium silicate is preferred.

Organic binders include PVA (polyvinylalcohol), CMC (carboxylmethylcellulose) and starch.

The heat-absorbing material of the invention may consist of a magnesium phosphate hydrate and a binder, excluding inevitable impurities.

The particles contain generally 1 to 99 wt % of magnesium phosphate hydrate and 1 to 99 wt % of binder, preferably 50 to 99 wt % of magnesium phosphate hydrate and 1 to 50 wt % of binder, more preferably 70 to 99 wt % of magnesium phosphate hydrate and 1 to 30 wt % of binder.

The invention uses granulated heat-absorbing material. If the heat-absorbing material is used in a state of powder, it is difficult to put the powder into a bag (e.g., difficult to seal the bag) and powder tends to be non-uniformly filled mainly in the bottom of the bag. The average diameter of the particles is preferably 0.01 mm to 20 mm, more preferably 0.1 mm to 15 mm. As the diameter decreases, the surface area increases, so that these become excellent as a heat-absorbing material but difficult to be handled.

The heat-absorbing material of the invention is usually used as being put in a container such as a bag and a case. It is preferred that the heat-absorbing material be put into a bag made of a heat-resistant cloth such as fabric, sheet and film and the bag be closed. Heat-resistant cloths include a glass cloth, a silica cloth and an alumina cloth. A cloth on the surface of which aluminum is deposited is excellent in heat resistance. The container is not required to be airtight.

Figure 1:
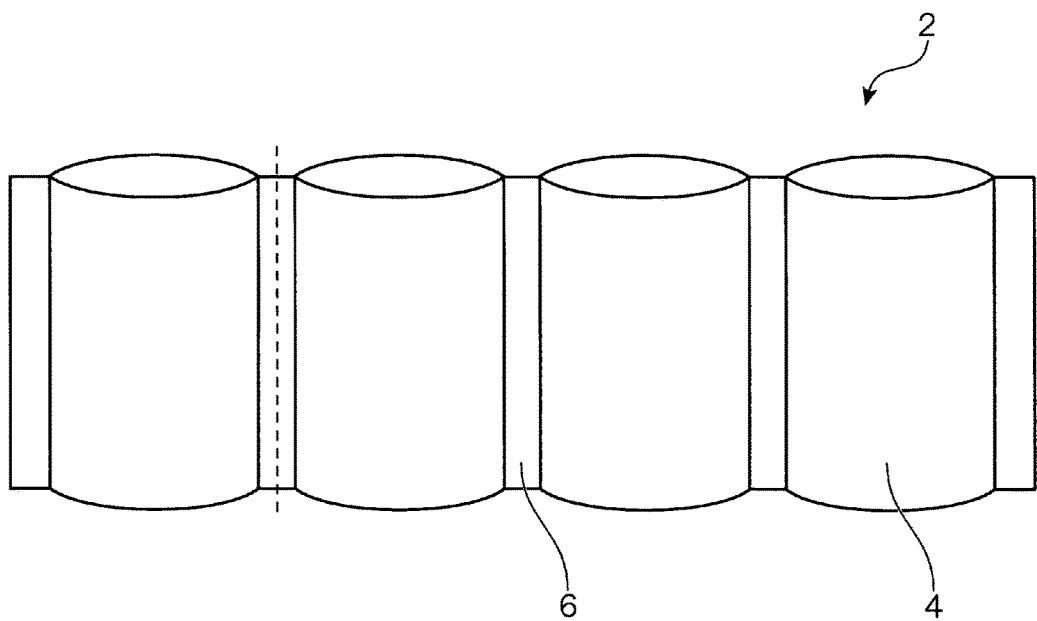
FIG. 1 is a perspective view of an example of a package used for the heat-absorbing material of the invention.

FIG. 1 is a perspective view of an example of a package used for the heat-absorbing material of the invention. A package 2 is formed from bags 4 connected at the sides thereof to each other in series with gussets 6 being present therebetween. Particles are put into a bag from the upper opening and the bag is closed. Such a package can conveniently be folded or rounded when carried to a narrow place. Further the package can be arranged in accordance with the shape of a place or object to be protected from heat. Part of the package may be used by cutting a gusset 6 connecting adjacent bags 4 along a dotted line shown in the drawing.

The particles used for the heat-absorbing material can be obtained by mixing a magnesium phosphate hydrate and a liquid glass ($Na_2O \cdot nSiO_2 \cdot mH_2O$) to form a mixture, granulating the mixture to form hydrous particles, and removing water from the hydrous particles. If necessary, the particles thus obtained are put into a container.

The heat-absorbing material of the invention can be solely used as a heat-insulator. The heat-absorbing material may be used together with other insulators to form more effective insulate structure exhibiting strong insulation and fire resistance.

EXAMPLES

Example 1

Magnesium phosphate tribasic octahydrate and liquid glass No. 3 (sodium silicate) ($Na_2O \cdot nSiO_2 \cdot mH_2O$ (n=3.0 to 3.4)) were mixed in a weight ratio of 91:9 and granulated to obtain hydrous particles with an average diameter of 2 mm to 7 mm. The water contained in the hydrous particles was removed by drying at 90° C. to obtain particles. The particles thus obtained were accommodated in bags made from glass cloth, thereby producing a heat-absorbing material. The shape of bags was a 160 mm×160 mm rectangle and the bags were connected in series with gussets having a width of 10 mm therebetween as shown in FIG. 1. The thickness was 25 mm.

Example 2

(1) Assembly of Refractory Structure

Figure 2:
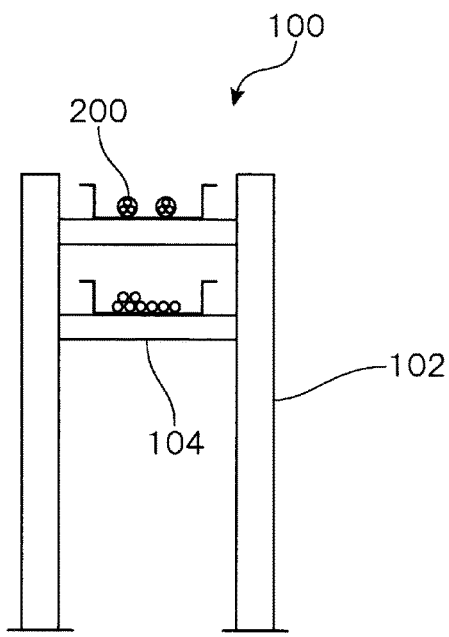
FIG. 2 is a longitudinal sectional view of a cable rack with cables thereon used in Example 2.
Figure 3:
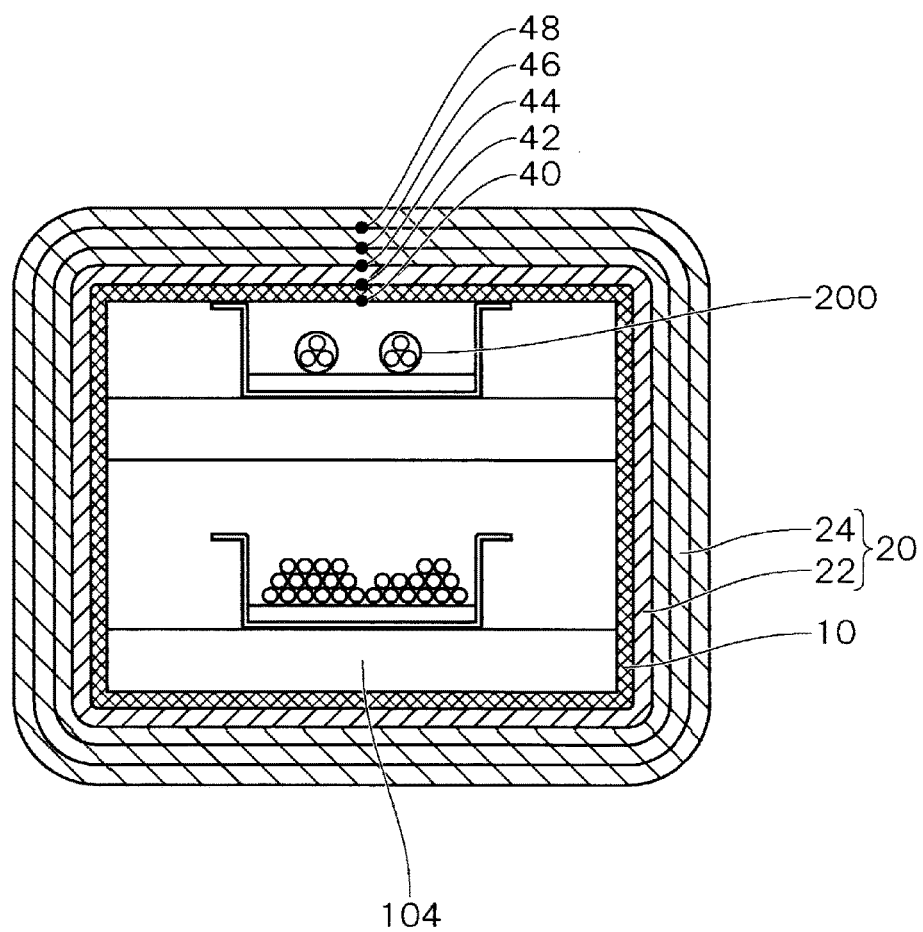
FIG. 3 is a schematic longitudinal sectional view of the refractory structure formed in Example 2.

A refractory structure shown in FIGS. 2 and 3 was assembled using the heat-absorbing material produced in Example 1 and the following first and second insulators. For the structure, a refractory test was conducted. FIG. 2 is a longitudinal sectional view of a cable rack with cables being mounted thereon used for the test. FIG. 3 is a schematic longitudinal sectional view of the refractory structure.

As shown in FIG. 2, legs 102 for a cable rack 100 were placed and shelf boards 104 were fixed to shelf supports of the cable rack, thereby assembling a cable rack 100. Cases with cables 200 therein were put on the shelf boards 104.

As shown in FIG. 3, the legs 102 and shelves 104 of cable rack were surrounded by the heat-absorbing material 10 produced in Example 1 and further by a layered insulator 20. The layered insulator 20 was a stack of one layer formed from the following first insulator 22 (20 mm) and three layers formed from the following second insulator 24 (25 mm×3), and the entire outer surface of the stack is wrapped with a silica cloth. In the layered insulator 20, the first insulator 22 was on the inside.

The cable rack 100 was placed in a vertical furnace.

First insulator: composite of aerogel and inorganic fiber (Pyrogel, Aspen Inc.)

Second insulator: bio-soluble fiber blanket (Composition of bio-soluble fiber: $SiO_2$ content, about 73 mass %; CaO content, about 25 mass %; MgO content, about 0.3 mass %; and $Al_2O_3$ content, about 2 mass %)

(2) Evaluation of Refractory Structure

FIG. 3 shows positions of thermocouples.

Thermocouples were placed between the second layer and the third layer from the inside of the second insulator 24 (48 in FIG. 3), between the first layer and the second layer from the inside of the second insulator 24 (46 in FIG. 3), between the second insulator 24 and first insulator 22 (44 in FIG. 3), between the first insulator 22 and heat-absorbing material 10 (42 in FIG. 3), and just above the cable case on the upper shelf (40 in FIG. 3).

In the vertical furnace, heating was conducted by a burner for 3 hours according to ISO standard fireproof curve, thereafter cooling by standing for 2 hours. Table 1 shows temperatures (° C.) measured after 1, 2, 3, 5, 8 and 10 hours at the positions of thermocouples.

As shown in Table 1, even when the temperature of the outside exceeded 1000° C., the temperature just above the cable case 40 was about 163° C., thereby confirming continuity of cables. The temperature just above the cable case 40 was maintained to be 100° C. for about 20 minutes after about 3 hours lapsed from the start of heating, which appears to be caused by evaporation of water contained in the heat-absorbing material.

TABLE 1

| | 1 hr | 2 hr | 3 hr | 5 hr | 8 hr | (° C.) 10 hr |
|---|---|---|---|---|---|---|
| Position 48 between 2nd layer and 3rd layer of 2nd insulator | 650 | 900 | 1030 | 370 | 155 | 110 |
| Position 46 between 1st layer and 2nd layer of 2nd insulator | 325 | 750 | 810 | 420 | 195 | 140 |
| Position 44 between 2nd insulator and 1st insulator | 150 | 570 | 740 | 390 | 195 | 150 |
| Position 42 between 1st insulator and heat-absorbing material | 40 | 100 | 240 | 220 | 175 | 160 |
| Position 40 just above cable case | 20 | 70 | 100 | 148 | 163 | 158 |

INDUSTRIAL APPLICABILITY

The heat-absorbing material of the invention can be used as a heat-absorbing material in places and equipment such as atomic power plants for which fire resistance is required.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the description is incorporated herein by reference in its entirety.

The invention claimed is:

1. A heat-absorbing material comprising particles comprising a magnesium phosphate hydrate and a binder, the amount of the magnesium phosphate hydrate being 70 to 99 wt %.

2. The heat-absorbing material according to claim 1, wherein the magnesium phosphate hydrate is magnesium phosphate tribasic octahydrate.

3. The heat-absorbing material according to claim 1, wherein the binder is an inorganic binder.

4. The heat-absorbing material according to claim 1, wherein the binder is sodium silicate.

5. The heat-absorbing material according to claim 1, wherein the particles have an average diameter of 0.01 mm to 20 mm.

6. The heat-absorbing material according to claim 1, wherein the particles are accommodated in a container.

7. The heat-absorbing material according to claim 6, wherein the container comprises a heat-resistant cloth.

8. The heat-absorbing material according to claim 7, wherein the heat-resistant cloth is a glass cloth, a silica cloth or an alumina cloth.

9. A heat-absorbing material comprising particles comprising a magnesium phosphate hydrate and a binder, wherein the particles are accommodated in a container that comprises a heat-resistant cloth, the heat-resistant cloth is a glass cloth, a silica cloth or an alumina cloth, and the heat-resistant cloth is a cloth with aluminum being deposited on a surface thereof.

10. The heat-absorbing material according to claim 6, wherein a plurality of the containers are serially connected to each other.

11. A method of producing the heat-absorbing material of claim 1, comprising;
    mixing a magnesium phosphate hydrate and a liquid glass to form a mixture,
    granulating the mixture to form hydrous particles, and
    removing water from the hydrous particles to obtain particles.

12. The method according to claim 11, further comprising accommodating the particles in a container.

13. The heat-absorbing material according to claim 8, wherein the binder is sodium silicate.

14. The method according to claim 11, further comprising accommodating the particles in a container that comprises a heat-resistant cloth, and the heat-resistant cloth is a glass cloth, a silica cloth or an alumina cloth.

15. The method according to claim 14, wherein the heat-resistant cloth is a cloth with aluminum being deposited on a surface thereof.

* * * * *